March 6, 1951　　F. C. W. STELTER　　2,544,621
TIMING DEVICE
Filed Feb. 5, 1947　　2 Sheets-Sheet 1
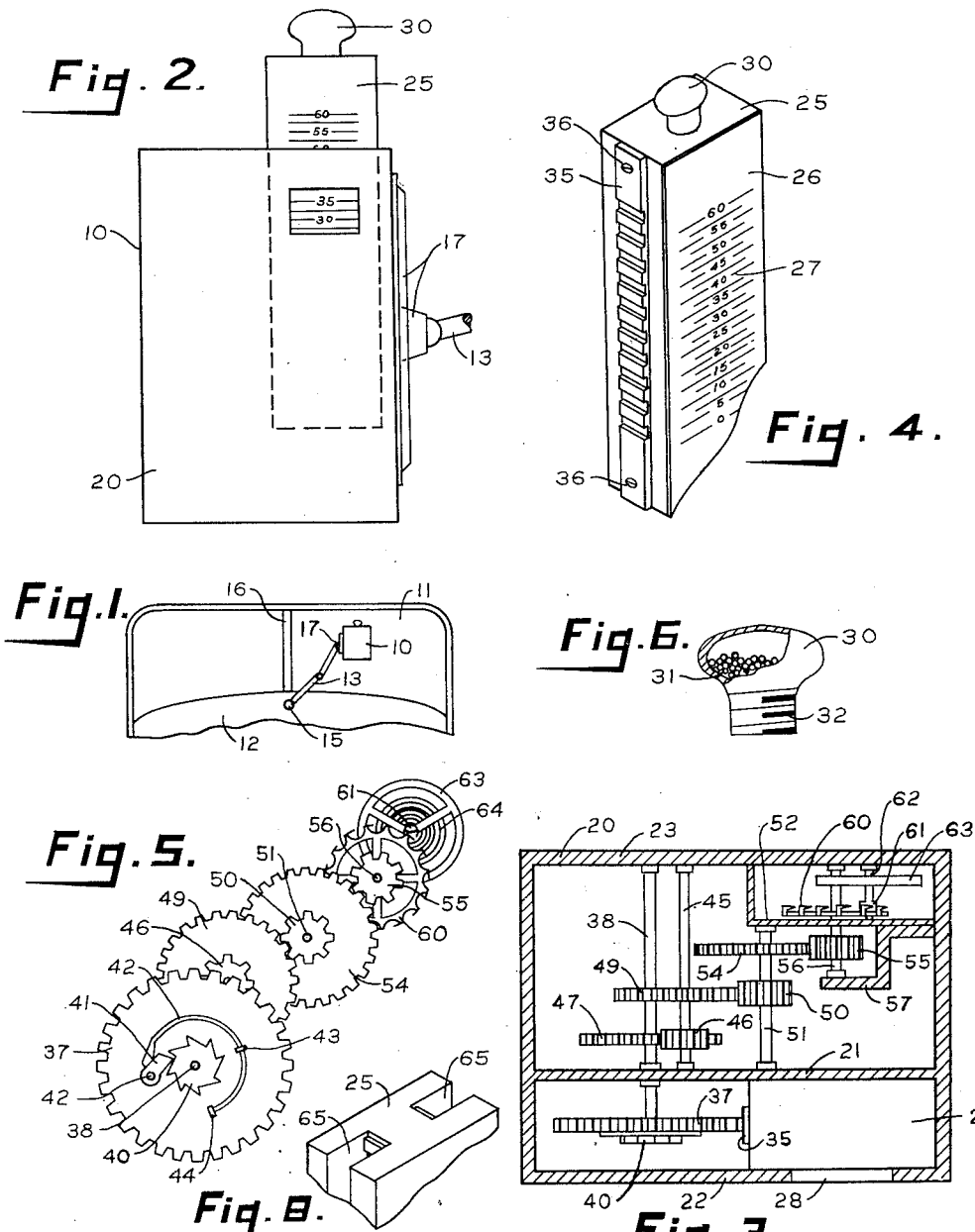
INVENTOR
Francis C. W. Stelter
BY Watson, Cole, Grindle & Watson
ATTORNEYS March 6, 1951 F. C. W. STELTER 2,544,621
TIMING DEVICE
Filed Feb. 5, 1947 2 Sheets-Sheet 2

INVENTOR
Francis C. W. Stelter
BY Watson, Cole, Grindle & Watson
ATTORNEYS

Patented Mar. 6, 1951

2,544,621

UNITED STATES PATENT OFFICE 2,544,621

TIMING DEVICE

Francis C. W. Stelter, New York, N. Y.

Application February 5, 1947, Serial No. 726,494

3 Claims. (Cl. 161—15)

This invention relates to timing devices or meters, and more particularly to devices of this character which are well adapted for use as parking meters for measuring and indicating the time during which a motor vehicle has been standing in a restricted area.

The general object of the invention is to provide a novel and improved device of the class described which is of simple and sturdy construction and not liable to get out of order and require frequent repairs.

Another object of the invention is the provision of a device of this type which comprises a gravity impelled weighted plunger as its driving element, and a clockwork escapement of novel construction for retarding the descent of the plunger.

A further object is the provision of means for regulating or adjusting the rate of descent of the plunger for calibrating the instrument.

Still another object of the invention is the provision of a novel mode of adjustably mounting the instrument, whereby it may be visible from the side-walk, no matter which side of the car is near the curb line so that a traffic officer or other interested party may readily read the meter.

Other objects and features of novelty, including the provision of means for determining at a glance whether or not the meter is running, will be apparent from the following specification when read in connection with the accompanying drawings in which certain embodiments of the invention are illustrated by way of example.

In the drawings:

Figure 1 is a view in elevation of the inner side of the windshield of an automobile, indicating the mode of installation of the novel parking meter;

Figure 2 is a view in front elevation on an enlarged scale, of a parking or timing meter embodying the principles of the invention;

Figure 3 is a view in horizontal section of the meter shown in Figure 1;

Figure 4 is a fragmentary perspective view of the weighted plunger used in the meter;

Figure 5 is a view in elevation of the clockwork escapement train actuated by the plunger;

Figure 6 is a view partly in elevation and partly in section and on a somewhat further enlarged scale, of a manipulating knob or handle applied to the plunger;

Figure 7 is a fragmentary view in horizontal section of another embodiment of the invention;

Figure 8 is a fragmentary perspective view of the plunger used in the embodiment shown in Figure 7;

Figure 9:
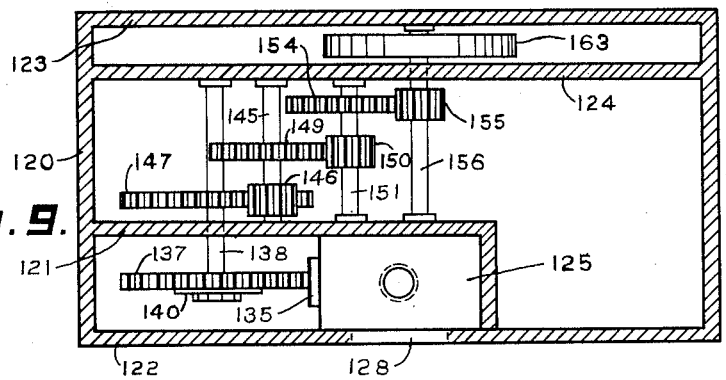
Figure 9 is a view in horizontal section of another embodiment of the invention, in which a fly wheel escapement is employed.

In Figure 1 of the drawings, the novel parking meter which embodies the principles of the invention is designated by the reference numeral 10 and is shown in one of its positions relative to the windshield 11 of an automobile in which it is installed. The upper portion of the instrument panel is indicated at 12 and a jointed supporting bracket 13 is frictionally pivoted for universal movement at 15 adjacent the lower end of the mullion 16 which divides the windshield in two parts. The bracket arm 13 is preferably formed in at least two sections which are also frictionally jointed and the outer end of the bracket is frictionally connected, for slidable and universal movement, to the metering instrument 10 as indicated at 17.

From this method of mounting it will be seen that the parking meter may be swung from one side of its pivot point 15 to the other and disposed in convenient positions for reading through either panel of the windshield 11, depending upon which side of the car is adjacent the curb. No novelty is claimed in the frictional joints per se for the bracket 13, and such joints and connections may be of any suitable or conventional type.

Referring now to Figures 2, 3, 4 and 5 of the drawings it will be seen that the meter 10 comprises a substantially rectangular casing 20 to which the bracket 13 is slidably and universally connected by means of the conventional frictional connecting devices 17. As indicated in Figure 3, a vertical partition 21 is disposed in the casing and at one side of the device between the partition 21 and the front wall 22 of the casing, there is disposed a vertically slidable plunger 25. This plunger is shown in considerable detail in Figure 4 and in the illustrated embodiment it is rectangular in shape; however, it might well be cylindrical so far as the broader aspects of the invention are concerned. With the rectangular configuration however, the plunger is well adapted to be guided in its vertical movement within the similarly shaped compartment as shown in Figure 3.

The plunger 25 may be made of any suitable material, although it is preferred to make it of metal in order to provide sufficient weight to actuate the escapement under the force of gravity. The plunger itself is inscribed or is provided with a card 26 upon which graduations 27 are imprinted, certain of the graduations being designated by numerals indicating elapsed time. The numerals are visible through the window or opening 28 in the casing which opening may be covered with glass or some suitable transparent plastic. The indicator card 26 may be of paper pasteboard, Celluloid, plastic or the like.

A knob or handle 30 is threaded into an opening in the top of the plunger 25 in order to provide for lifting the plunger back to zero position at the beginning of a new parking period. The knob 30 is preferably adapted to receive a quantity of shot 31 or any other weighting material such as sand, pebbles or the like. Obviously, the amount of this added material may be regulated in order to adjust the total weight of the plunger 25 and thus regulate to a certain degree the time of descent. Screw threads 32 are provided upon the shank of the knob 30 whereby it may be screwed into the plunger.

Upon one side of the plunger there is secured a rack 35 as by means of the screws 36, or if desired the rack may be made integral with the plunger. The teeth 36 of the rack mesh with the teeth of the gear 37 which is loosely mounted upon the outer end of the horizontal shaft 38, this shaft being mounted in bearings provided in the rear wall 23 of the casing 20 and in the partition 21. Upon the extreme outer end of the shaft 38, there is fixed a star wheel or ratchet wheel 40. A pawl 41 is pivoted as at 42 upon one side of the gear wheel 37 and is pressed toward engagement with the sprocket 40 by means of the substantially semicircular leaf spring 42, this spring being anchored adjacent its further end to the gear 37 as at 43 and 44.

Disposed in parallel relationship to shaft 38 and supported at bearings carried by the wall 23 and the partition 21, is another shaft 45 which carries a pinion 46 meshing with and adapted to be driven by the gear 47 fixed at an intermediate point upon the shaft 38. The shaft 45 also carries a gear which is adapted to drive the pinion 50 carried upon the shaft 51 which rotates in bearings carried by the partition 21 and by the angular partition 52 at one corner of the casing 20. A gear 54 fixed upon the shaft 51 is adapted to drive a pinion 55 fixed to the escapement shaft 56, this last named shaft having one of its bearings in angular bracket 57 and its other in the rear wall 23 of the casing, the shaft passing through an opening in the partition 52.

Within the scope of the invention, any type of escapement may be employed in this embodiment, the one shown as an example being of the cylinder escapement type and including the escapement ratchet wheel 60 carried upon the shaft 56 and being in operative engagement with the usual click or pallet portions 61 carried on the fly wheel shaft 62 upon which the fly wheel 63 is mounted for oscillating movement under the control of the hair spring 64. An anchor escapement including the usual opposed pallets carried by an oscillating lever would do just as well.

The operation of the device will be readily understood. If the plunger 25 is in its lowermost position, it is lifted by means of the handle 30 to its upper limit of movement whereupon the "0" index will be seen through the window opening 28. During the upward movement of the plunger the rack 35 will rotate the gear 37 but the shaft 38 will not move, the pawl or click 41 moving idly around the ratchet 40 in a counter-clockwise direction as viewed in Figure 5. When the uppermost position is reached, the weight of the plunger 25 will immediately cause the gear 37 to rotate in a clockwise direction, with the pawl 41 in engagement with the nearest tooth on the ratchet 40.

The relative sizes of the driving gears and driven pinions in the gear train and the operation of the escapement 60—63 which terminates the train, insures that the descent of the plunger 25 is at a very slow rate. For example, the retardation of the plunger can be so arranged that it will take an hour for the plunger to move from its uppermost to its lowermost position under the force of gravity. The calibrations 27 on the card 26 are initially made to conform to the general movemnt of the plunger and any necessary finer adjustment may be made when the device is assembled, or from time to time thereafter, by varying the amount of material 31 within the knob 30.

In Figures 7 and 8 of the drawings there is illustrated a slight modification of the embodiment shown in the earlier figures in which the plunger 25' is provided with slots or kerfs 65 in each side wall thereof and a rack 35' formed or secured at the bottom of each of the kerfs or slots 65. In this way the driven gear 37 carried by the first shaft 38 of the escapement train may be fitted within the slot and the casing may be made considerably smaller due to this "telescoping" of the gear and plunger. Also, if desired, an additional gear 37' carried upon a shaft 38' may be provided within the slot at the opposite side of the plunger, to form part of an alternative or additional escapement or merely as a balanced guiding expedient for the plunger.

In Figure 9 of the drawings there is illustrated another embodiment of the invention which is carried in a casing 120 having a front wall 122, a rear wall 123, and inner partition walls 121 and 124. For symmetry, the plunger 125 is disposed centrally of the casing or housing 120 and is guided by the angular partition 121 and the front wall 122, a window 128 being provided for viewing the graduations on the plunger.

In this embodiment the rack 135 on the plunger drives the gear 137 which is carried by the shaft 138, a ratchet device 140 being employed which is equivalent to the one shown at 40—42 in the earlier described embodiment. The gear 147 on the shaft 138 drives the pinion 146 carried by the shaft 145 and the gear 149 also mounted on the shaft 145 drives the pinion 150 on the shaft 151. The shaft 151 also carries a gear 154 which drives the pinion 155 on the fly wheel shaft 156. Between the partition 124 and the rear wall 123 of the housing an inertia fly wheel 163 is disposed, this wheel being fixed upon the shaft 156.

It will be readily understood that the fly wheel, which if desired may be provided with blades or fins to afford further resistance to its movement through the air, will effectually retard the falling movement of the plunger 125 and provide an inertia escapement device.

Figure 10:
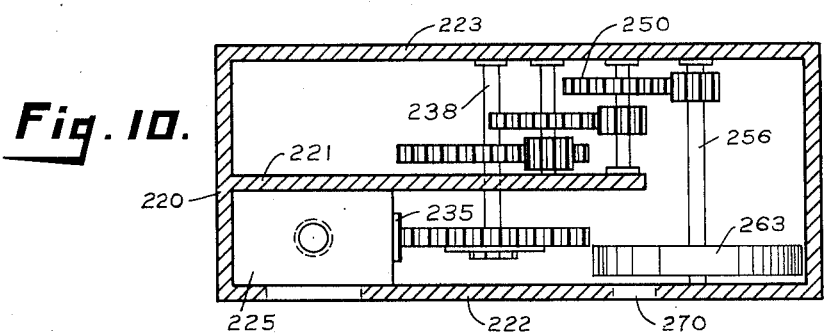
Figures 10 and 11 are horizontal and vertical sectional views respectively of an embodiment similar to that shown in Figure 9.
Figure 11:
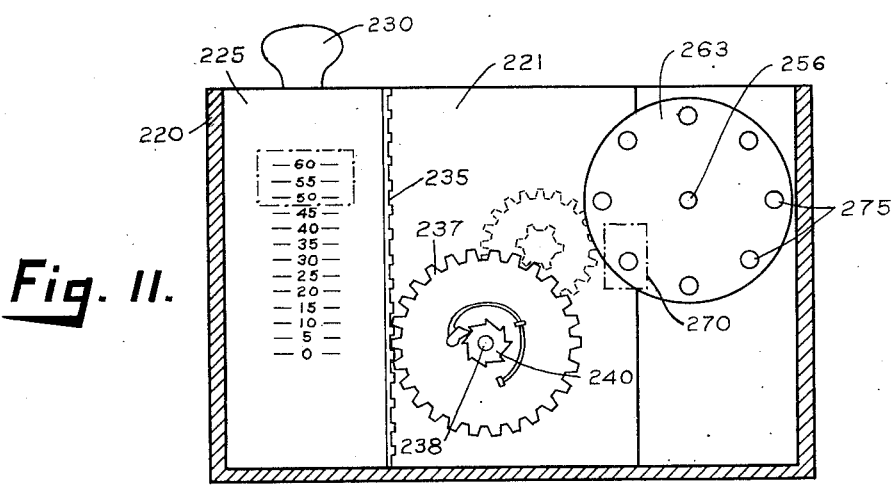

In the embodiment shown in Figures 10 and 11 of the drawings this same inertia escapement system is employed, but the arrangement of the parts is such that the movement of the fly wheel is visible through a peep-hole on the same side of the casing as the window through which the graduations on the plunger may be observed. In this embodiment the casing 220, having the front wall 222 and the rear wall 223, is also provided with a vertical partition 221 which encloses the plunger 225 and provides bearing support for the various shafts of the gear train. A rack 235 on the side of the plunger meshes with the gear 237 which is provided with the ratchet mechanism 240 similar to the ones already described. The gear 237 is mounted upon the shaft 238 and the gear train, which is in all ways similar to the one described in connection with Figure 9, is indicated generally by the reference numeral 250. The fly wheel shaft 256 however, is so disposed, and the fly wheel 263 is so mounted thereon, that it is visible, at least in part, through the peephole or opening 270. At regular intervals about the front face of the fly wheel 263, there are provided the spots 275 which may be either raised or indented portions on the fly wheel, or may be shaded colored areas thereon, and may be readily observed through the opening 270 and the movement of the fly wheel thus detected.

It is understood that various modifications and changes may be made in the embodiments illustrated and described herein without departing from the scope of the invention as defined by the following claims.

It is also understood, that within the scope of the claims, the timing devices forming the subject of the invention may be employed for a variety of purposes and are not limited in function except as indicated.

Having thus described the invention, what is claimed as new and desired to be secured by Letters Patent is:

1. A timing device comprising a casing, a gravity actuated member guided for vertical sliding movement within the casing, a retardation gear train, means operatively connecting said train to said member for retarding the fall of said member from its uppermost position to its lowermost position, an elapsed time indicating means associated with said member and said casing, a hollow knob on said member whereby it may be lifted from its lowermost to its uppermost position to start the timing operation, and a readily variable quantity of particles contained within said knob, whereby the weight of said member and consequently its rate of retarded fall may be varied, said operative connecting means including a one-way clutch whereby the train will be driven by said member only during its falling movement.

2. A timing device comprising a casing, a gravity actuated member of rectangular cross section guided for vertical sliding movement within the casing, a retardation gear train, a vertical kerf in at least one of the side walls of said member to embrace and receive a portion of the toothed periphery of the initial gear of the retardation train, and a rack on said member at the bottom of said kerf meshing with said gear, whereby the inter-fitting of the kerfed member and the gear serves to guide the member in its vertical path and prevent lateral displacement of the member.

3. A timing device comprising a casing, a gravity actuated member guided for vertical sliding movement within a laterally disposed portion of the casing, a retardation gear train, means operatively connecting said train to said member for retarding the fall of said member from its uppermost position to its lowermost position, an elapsed time indicating means associated with said member and an opening for viewing said indicating means through the wall of said lateral portion of said casing, said retardation gear train being one of increasing velocity and terminating in a fly wheel, said fly wheel being contained within the opposite laterally disposed portion of the casing, interruptions in the visual circular continuity of the fly wheel, and an opening in the last named laterally disposed portion of said casing adjacent said fly wheel through which the fly wheel may be viewed in order to determine whether or not the device is running.

FRANCIS C. W. STELTER.

REFERENCES CITED

The following references are of record in the file of this patent:

UNITED STATES PATENTS

| Number | Name | Date |
|---|---|---|
| 1,775,256 | Rowe | Sept. 9, 1930 |
| 2,095,114 | Wood et al. | Oct. 5, 1937 |
| 2,234,437 | Kistler | Mar. 11, 1941 |